United States Patent [19]
Niconchuk

[11] 3,783,715
[45] Jan. 8, 1974

[54] TIRE REPAIR TOOLS

[76] Inventor: Alec W. Niconchuk, 267 Lowell St., Peabody, Mass. 01960

[22] Filed: Nov. 1, 1971

[21] Appl. No.: 194,113

[52] U.S. Cl. .............................................. 81/15.7
[51] Int. Cl. .......................................... B60c 25/16
[58] Field of Search.................. 81/15.7, 15.2, 15.6; 152/370

[56] References Cited
UNITED STATES PATENTS
3,342,240  9/1967  Williams ............................ 152/370
1,606,602  11/1926  Stauffer ............................... 81/15.7

Primary Examiner—Granville Y. Custer, Jr.
Assistant Examiner—Roscoe V. Parker
Attorney—Maurice R. Boiteau

[57] ABSTRACT

There is disclosed in the specification a tire repair tool for inserting plugging material typically in the form of rubber coated twisted strands, into a tire puncture. The plugging material is threaded into the open eye of a needle forming a part of the tool and inserted into the puncture. The inserting motion is limited by a stop free to rotate on the needle's shank so that the ends of the strand are not drawn into the puncture and the stop also limits the withdrawal of the needle.

3 Claims, 6 Drawing Figures

PATENTED JAN 8 1974 3,783,715
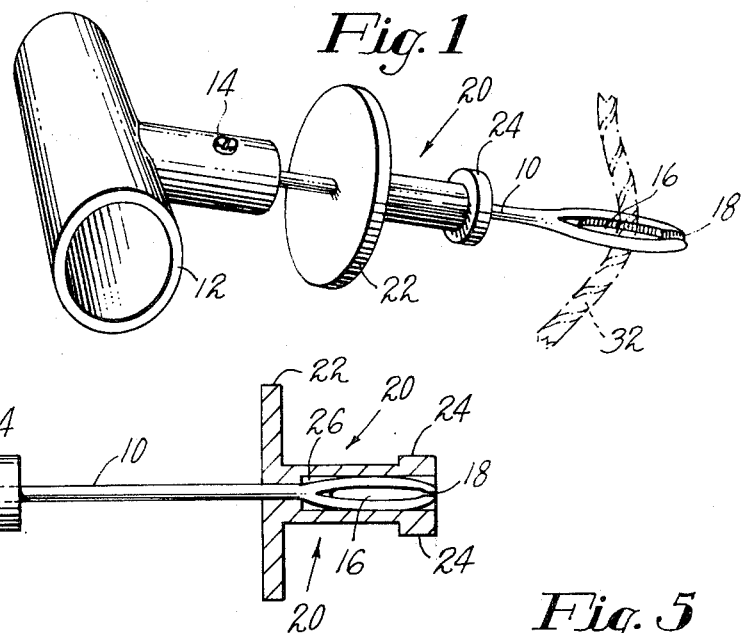
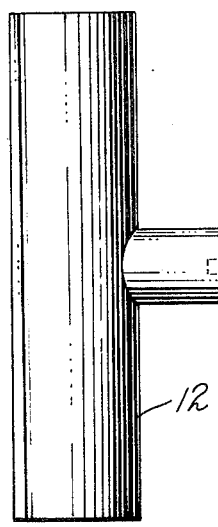
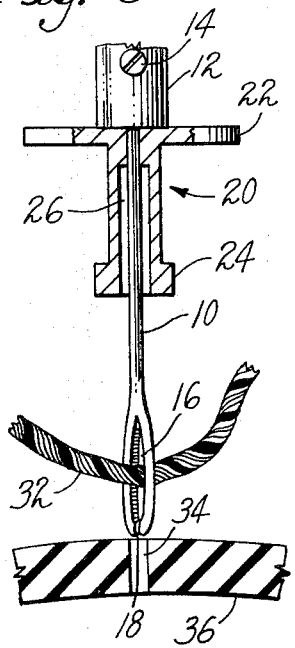
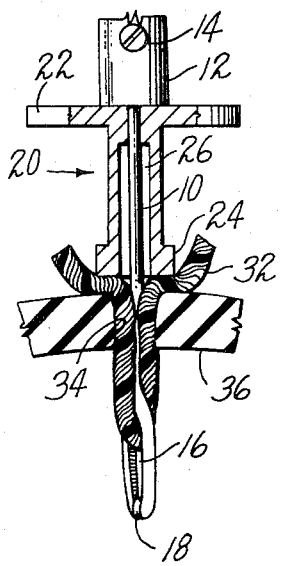
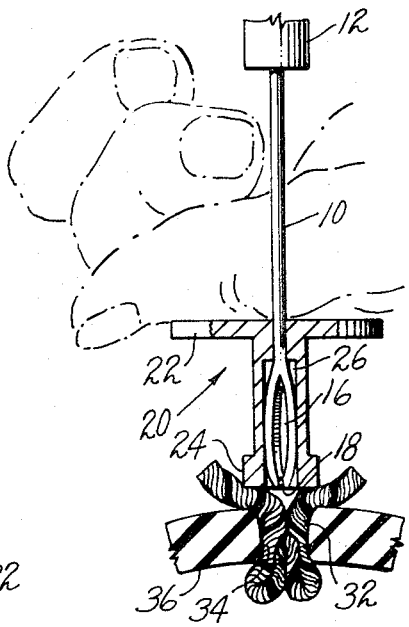
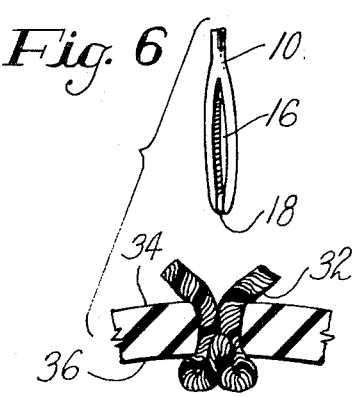

TIRE REPAIR TOOLS

The present application relates generally to improvements in tools for inserting plugging materials into punctures in tubeless automobile tires and more particularly to such tools especially adapted for inserting plugging material in the form of twisted rubber coated fibrous strands into such punctures.

The repair of punctures in tubeless automobile tires is conventionally accomplished with fibrous strands from the exterior of the tire by inserting a bight of the strands from the outside into the tire leaving the two free ends outside the tire. The bight is then withdrawn thereby positioning four plies of strand in the puncture. Unless care is exercised, the inserting tool is sometimes pushed too deeply into the tire with the result that the free ends of the bight are projected into the tire and the strands lost. On the other hand, the inserting tool is sometimes withdrawn too far out of the tire with the result that the strand is removed completely from the puncture and the inserting operation must be started over again. The loss of plugging material in the tire together with the second plug which finally seals the puncture cumulatively upsets the balance of the tire and also results in a loss of time. When the plugging material is completely withdrawn from the tire necessitating a repeat plugging operation there is a consequent loss of time.

It is accordingly an object of the present invention to improve the efficiency of tubeless tire repairs in both labor and materials.

Another object is to permit the repair of punctures in tubeless tires to be accomplished quickly and with a minimum of tire unbalancing material.

Another object is to provide a tool which is economically manufactured and is both simple and foolproof in its use.

The foregoing objects are achieved according to the invention by a puncture repair tool of the type including a needle for carrying the plugging strand. The shaft of the needle which has an open eye is fitted to and replaceable in a handle. According to a feature of the invention a freely rotatable stop member is held captive between the handle and the needle eye. The length of the stop is such that it limits the degree of penetration of the needle into the tire to retain outside the tire the ends of the strand carried by the needle. The stop member is internally shaped to receive the eye of the needle and to limit its withdrawal from the tire to prevent removal of the strand from the puncture.

The foregoing objects and features together with numerous advantages being derived from the invention will be more fully understood from the following detailed description of an illustrative embodiment taken in connection with the accompanying drawings in which:

FIG. 1 is a view in perspective of a puncture repair tool according to the present invention;

FIG. 2 is a longitudinal view of the tool in FIG. 1 with a stop bushing forming a part of the tool shown in cross-section to illustrate interior construction;

FIG. 3 is a view of the tool of FIGS. 1 and 2 shown ready for insertion of a plugging strand into a tire puncture;

FIG. 4 is a view similar to FIG. 3 but showing the plugging strand and tool in the puncture;

FIG. 5 is a view similar to FIGS. 3 and 4 but showing the parts of the tool in the relative positions which they occupy at the end of a puncture plugging operation; and FIG. 6 is a view showing a fragment of the tool after separation from the tire plugging strand.

Turning now to the drawings, it is seen that the tool according to the invention comprises a needle 10 fitted to a Tee-shaped handle 12 in which it is retained by a set screw 14. An open eye 16 including a slot 18 is formed in the free end of the needle and a stop bushing indicated generally at 20 is retained captive on the shank of the needle between the handle and an enlargement in the shank diameter to accommodate the eye 16.

The bushing 20 is formed with a flange 22 and an integral abutment collar 24. At its upper end, the bushing 20 is perforated to fit loosely on the shank of the needle 10 and at its lower end it is counterbored at 26 to a depth slightly greater than the length of the enlargement for the eye 16.

In using the tool, the approximate mid-point of a twisted strand 32 is inserted into the eye 16 to form a bight as shown in FIG. 3. The arrangement of a single ply of strand 32 as shown in FIGS. 3 to 6 inclusive, is suitable for relatively smaller punctures such as that shown at 34 in a tire 36. For larger punctures, the strand 32 is twice as long and inserted double in the needle eye.

The needle carrying the bight in the strand 32 is then inserted into the puncture 34 and forced into the tire 36 as deeply as possible until the collar 24 abuts the tire and prevents further penetration. The strand 32 should be of such a length that under these conditions, the ends of the strand extend approximately 1/2 inch outside the puncture 34. At this time, the bight in the strand 32 has been forced into the upper end of the eye 16.

One hand is then pressed down upon the flange 22 to hold the collar 24 in engagement with the tire while the needle is withdrawn to the position shown in FIG. 5. During the withdrawal, the bight in the strand 32 first slides to the lower end of the eye 16 and as the bight enters the puncture between the two legs of the strand in the puncture, the added resistance pushes the bight out of the slot 18 thereby leaving the bight wedged between the legs to form a sealing plug. The needle 10 emerges from the puncture 34 completely free from the strand, the enlarged portion of the needle in which the eye 16 is formed, having been withdrawn into the counterbore 26 as shown in FIG. 5.

From the foregoing, it is seen that the motions required for inserting the plugging material into a puncture are limited in both directions to achieve more accurate placement of the plugging material than has heretofore been possible. However, in spite of the greater accuracy, the inserting motions require neither more force nor more time in their accomplishment than would be necessary with conventional tools.

I claim:

1. A tool for inserting a plugging strand into a tire comprising a needle having an eye opened at the terminal end thereof and formed by a pair of opposed spring tempered arms defining a slot narrower than the thickness of the strand for receiving the strand, a handle into which the needle is carried and a stop bushing captive on the needle between the needle eye and the handle, whereby the strand is first retained in the eye as the needle is withdrawn from the tire and then snaps out of the eye as the arms spread apart under the resistance offered by the tire to passage of the strand.

2. A tool according to claim 1 further characterized in that the needle is formed with an enlargement to accomodate the eye and the bushing is counterbored to a diameter and depth greater than those of the enlargement for receiving the enlargement.

3. A tool according to claim 1 further characterized in that the bushing is free for movement relative to the handle and is formed with a flange engageable by one hand of the user to maintain the bushing in contact with the tire while the needle is withdrawn from the tire.

* * * * *